Sept. 8, 1959 W. L. GLOMB 2,903,650
SYNCHRONIZED OSCILLATORS
Filed March 6, 1956
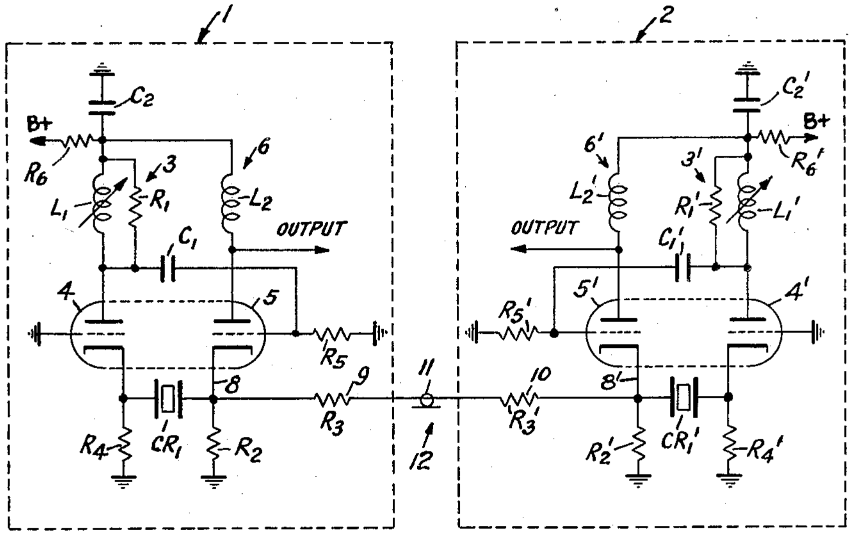
INVENTOR
WALTER L. GLOMB
BY Alfred C. Hill
AGENT

United States Patent Office 2,903,650

Patented Sept. 8, 1959

2,903,650

SYNCHRONIZED OSCILLATORS

Walter L. Glomb, Clifton, N.J., assignor to International Telephone and Telegraph Corporation, Nutley, N.J., a corporation of Maryland Application March 6, 1956, Serial No. 569,839

8 Claims. (Cl. 331—56)

This invention relates to oscillators and more particularly to a means to synchronize in both phase and frequency the outputs of a pair of oscillators.

It has been disclosed in the copending application of R. C. Ferrar-H. A. French, Serial No. 569,806, filed March 6, 1956, entitled "Communication System," having the same assignee as the present application, that the disadvantages of switchover equipment of the usual "standby" communication system could be overcome if the equipment therein were in operation full-time and connected in parallel. Thus, the transmitters would each be modulated by the same video signal and provide parallel signal outputs wherein failure in one of the transmitters would not disrupt communications. In such an arrangement, it is essential that the radio frequency output of each transmitter be identical in phase and frequency.

This can be accomplished by employing the oscillator of one transmitter to drive both transmitters and at the same time bias off the oscillator of the other transmitter. The interconnection between these two oscillators would be such that failure in the driving oscillator would result in removing the bias from the other oscillator which would then supply energy for its own transmitter only. This arrangement requires two interconnections, one for the signal and one for the bias voltage. This results in non-symmetrical circuits and, as a consequence, empty taps and plugs, thereby increasing the cost of the manufacturing of the communication system.

Therefore, an object of this invention is to provide an improved means to synchronize in both frequency and phase the oscillators of parallel operated transmitters which will result in simpler circuitry and reduced cost of manufacturing.

Another object of this invention is to provide a single interconnection to synchronize in both frequency and phase the oscillators of parallel operated transmitters which will result in symmetrical circuits.

A feature of this invention is the provision of a pair of identical oscillators and a conductor interconnecting symmetrical points of said oscillators to lock said oscillators in frequency and phase and which in event of failure of either of said oscillators such failure has no effect on the operation of the other oscillator.

Another feature of this invention is the provision of a pair of identical crystal controlled oscillators, a voltage divider coupled to symmetrical points of each of said oscillators and a conductor interconnecting said voltage dividers to lock said oscillators in frequency and phase and which in event of failure of one of said oscillators such failure has no effect on the operation of the other oscillator.

The above-mentioned and other features and objects of this invention and the manner of obtaining them will become more apparent by reference to the following description taken in conjunction with the drawing, the single figure of which illustrates an embodiment of my invention.

The sole figure of the drawing illustrates in schematic form two identical cathode coupled crystal oscillators 1 and 2 each including an anode load 3 for the grounded grid electron discharge device 4 tuned by $L_1$ to the crystal fundamental frequency and an electron discharge device 5 which is a true cathode follower for the fundamental frequency, since its anode load 6 is tuned to the crystal third harmonic. The voltage dividers 9 and 10 and the conductor 11 provide both A.C. and D.C. coupling between the cathodes 8 and 8′ of discharge devices 5 and 5′, the cathode follower sections of the oscillators. It is through this interconnection of the oscillators 1 and 2 that synchronization is accomplished.

With the interconnection 12 as illustrated, the oscillators 1 and 2 will be locked in frequency and phase. This interconnection provides, in addition, these further following advantages: (1) If either oscillator fails, the other oscillator will be capable of operating alone, (2) either oscillator shall cease operating rather than operate on a frequency different than its mate, and (3) when either oscillator ceases to operate, the output therefrom shall be zero. It has been observed experimentally that the two oscillators will operate synchronously with crystals differing in frequency by as much as 0.05 percent. Employing as the crystals a CR–23/U crystal, the phase of one oscillator with respect to the other may be varied approximately ±90 degrees before synchronization is lost. The synchronized frequency in such a situation is always very close to the higher of the two crystal frequencies. The synchronizing connection of this invention presents some load to an operating oscillator when its mate fails. However, the drop in one oscillator's output when the other fails is small and does not effect the output power of its transmitter.

When the natural frequency of a given oscillator is changed, for example, by varying $L_1$ or by faulty operation thereof, the net result in the synchronized case is a shift in phase of one oscillator with respect to the other. This phase shift increases the detuning until relative phase of ±90 degrees is reached at which point synchronization ceases. However, the circuit parameters are so chosen that at this point the detuned oscillator's operation is marginal, and the first positive transient on its cathode due to the beat between its free running frequency and that of its mate quenches oscillation.

In the event of crystal failure or any other failure in a given transmitter, the system design requires: that the subject transmitter output be zero and an alarm indication be generated. Inasmuch as the failure of the crystal in a given oscillator simply replaces the selective circuit with a capacitive reactance of comparable magnitude, the oscillator still behaves as a rather high gain amplifier at its natural frequency. The synchronizing voltage can then be amplified and results in power out of the failed transmitter, contrary to the requirement mentioned above. However, if the stage following the oscillator is a frequency multiplier which relies on tube non-linearity for its operation, as is the case when employing this oscillator in the system of the above-mentioned copending application, it is possible by choice of oscillator parameters to reduce the voltage level, under a failed condition, into the multiplier below the non-linear region. This has been done with satisfactory results.

The circuit of my invention has been applied to two crystal controlled oscillator pairs covering the frequency ranges 47–56 megacycles and 55–67 megacycles with satisfactory results. The critical parameters in the oscillator are $R_1$, the plate damping resistor; $R_2$, the cathode follower load; and $R_3$, the synchronizing voltage divider. Typical parameters chosen in a reduction to practice of of the circuit of this invention for the frequency range 47–56 megacycles are listed hereinbelow.

$R_1=R_1'=$56,000 ohms
$R_2=R_2'=$330 ohms
$R_3=R_3'=$150 ohms
$R_4=R_4'=$470 ohms
$R_5=R_5'=$100,000 ohms
$R_6=R_6'=$18,000 ohms
$L_1=L_1'=$(F=47–56 megacycles)
$L_2=L_2'=$(F=141–168 megacycles)
$C_1=C_1'=$27 mmf.
$C_2=C_2'=$0.001 mf.
$CR_1=CR_1'=$CR-23/U (47–56 megacycles)
Tube type =2C51
B+supply=250 volts While I have described above the principles of my invention in connection with specific apparatus, it is to be clearly understood that this description is made only by way of example and not as a limitation to the scope of my invention as set forth in the objects thereof and in the accompanying claims.

I claim:

1. A synchronizing circuit for two oscillators comprising a pair of identical oscillators each adapted for independent operation and having separate and independent output circuits and means including a conductor interconnecting symmetrical points of said oscillators other than said output circuits to lock said oscillators in frequency and phase, said means further including means to maintain each of said oscillators in operating condition upon failure of the other oscillator.

2. A synchronizing circuit for two oscillators comprising a pair of identical oscillators each adapted for independent operation and having separate and independent output circuits and means including a voltage divider coupled to symmetrical points of said oscillators other than said output circuits and a conductor coupled between said voltage dividers to lock said oscillators in frequency and phase, said means further including means to maintain each of said oscillators in operating condition upon failure of the other oscillator.

3. A synchronizing circuit for two oscillators comprising a pair of identical crystal controlled oscillators each adapted for independent operation and having separate and independent output circuits and means including a conductor interconnecting symmetrical points of said oscillators other than said output circuits to lock said oscillators in frequency and phase, said means further including means to maintain each of said oscillators in operating condition upon failure of the other oscillator.

4. A synchronizing circuit for two oscillators comprising a pair of identical crystal controlled oscillators each adapted for independent operation and having separate and independent output circuits and means including a voltage divider coupled to symmetrical points of said oscillators other than said output circuits and a conductor coupled between said voltage dividers to lock said oscillators in frequency and phase, said means further including means to maintian each of said oscillators in operating condition upon failure of the other oscillator.

5. A synchronizing circuit for two oscillators comprising a pair of identical oscillators each adapted for independent operation; each of said oscillators including a pair of electron discharge devices each having at least a cathode, a control electrode and an anode, a crystal coupled between the cathodes of said discharge devices, means grounding the control electrode of one of said discharge devices, a tuned circuit in the anode circuit of said one of said discharge devices responsive to the fundamental frequency of said crystal, means connecting the anode of said one discharge device to the control electrode of the other of said discharge devices, said other of said discharge devices being a cathode follower for the fundamental frequency of said crystal; and means including a conductor coupled between the cathodes of said other of said discharge devices of said oscillators to lock said oscillators in frequency and phase, said means further including means to maintain each of said oscillators in operating condition upon failure of the other oscillator.

6. A synchronizing circuit for two oscillators comprising a pair of identical oscillators each adapted for independent operation; each of said oscillators including a pair of electron discharge devices each having at least a cathode, a control electrode and an anode, a crystal coupled between the cathodes of said discharge devices, means grounding the control electrode of one of said discharge devices, a tuned circuit in the anode circuit of said one of said discharge devices responsive to the fundamental frequency of said crystal, means connecting the anode of said one discharge device to the control electrode to the other of said discharge devices, said other of said discharge devices being a cathode follower for the fundamental frequency of said crystal; and means including a voltage divider coupled to the cathode of each of said other discharge devices and a conductor coupled between the voltage divider of each of said oscillators to lock said oscillators in frequency and phase, said means further including means to maintain each of said oscillators in operating condition upon failure of the other oscillator.

7. A synchronizing circuit for two oscillators comprising a pair of identical oscillators each adapted for independent operation; each of said oscillators including a first and second electron discharge device having at least a cathode, an anode and a control electrode, a crystal coupled between the cathodes of said first and second discharge devices, a first tuned circuit tuned to the fundamental frequency of said crystal coupled to the anode of said first discharge device, means grounding the control electrode of said first discharge device, a resistor coupled between the cathode of said first discharge device and ground, a capacitor coupled between the anode of said first electrode device and the control electrode of said second discharge device, a resistor coupled between the control electrode of said second discharge device and ground, a second tuned circuit tuned to a harmonic of the fundamental frequency of said crystal coupled to the anode of said second discharge device, a voltage source coupled in series with said first and second tuned circuits, means removing the output frequency from the anode of said second discharge device, and a resistor coupled between the cathode of said second discharge device and ground; and means including a conductor coupled between the cathode of each of said second discharge devices to lock said oscillators in frequency and phase, said means including the cathode resistor of each of said second discharge devices to maintain each of said oscillators in operating condition upon failure of the other oscillator.

8. A synchronizing circuit for two oscillators comprising a pair of identical oscillators each adapted for independent operation; each of said oscillators including a first and second discharge device having at least a cathode, an anode and a control electrode, a crystal coupled between the cathodes of said first and second discharge devices, a first tuned circuit tuned to the fundamental frequency of said crystal coupled to the anode of said first discharge device, means grounding the control electrode of said first discharge device, a resistor coupled between the cathode of said first discharge device and ground, a capacitor coupled between the anode of said first discharge device and the control electrode of said second discharge device, a resistor coupled between the control electrode of said second discharge device and ground, a second tuned circuit tuned to a harmonic of a fundamental frequency of said crystal coupled to the anode of said second discharge device, a voltage source coupled in series with said first and second tuned circuits, means removing the output frequency from the anode of said second discharge device and a resistor coupled between the cathode of said second discharge device and ground; and means including a voltage divider coupled to the cathode of each of said second discharge devices and a conductor coupled between the voltage divider of each of said oscillators to lock said oscillators in frequency and phase, said means including the cathode resistor of each of said second discharge devices to maintain each of said oscillators in operating condition upon failure of the other oscillator.

References Cited in the file of this patent

UNITED STATES PATENTS

| | | |
|---|---|---|
| 2,098,386 | Hansell | Nov. 9, 1937 |
| 2,177,272 | Zottu | Oct. 24, 1939 |
| 2,559,388 | Baldridge | July 3, 1951 |